United States Patent [19]

Kawaichi et al.

[11] Patent Number: 5,099,779
[45] Date of Patent: Mar. 31, 1992

[54] LNG TANK FOR SHIPS SUPPORTED BY MEANS OF SKIRT

[75] Inventors: Katsumi Kawaichi; Tomoaki Iyoku, both of Akunoura, Japan

[73] Assignee: Mitsubishi Jukogyo Kabushiki Kaisha, Tokyo, Japan

[21] Appl. No.: 596,688

[22] Filed: Oct. 12, 1990

[30] Foreign Application Priority Data

Oct. 13, 1989 [JP] Japan .................................. 1-267566

[51] Int. Cl.$^5$ .............................................. B67B 25/14
[52] U.S. Cl. ..................................... 114/74 A; 220/901
[58] Field of Search ........................... 114/74 R, 74 A; 220/400, 415, 901

[56] References Cited

U.S. PATENT DOCUMENTS

| | | | |
|---|---|---|---|
| 1,866,517 | 7/1932 | Heylandt | 114/74 A |
| 2,799,425 | 7/1957 | Werker | 114/74 A |
| 2,954,892 | 10/1960 | Dosker | 114/74 A |
| 3,270,700 | 9/1966 | Kohn et al. | 114/74 A |
| 3,894,505 | 7/1975 | Murphy | 114/74 A |

FOREIGN PATENT DOCUMENTS

| | | | |
|---|---|---|---|
| 2005082 | 12/1969 | France | 114/74 A |
| 63-57999 | 8/1988 | Japan | |
| 4857709 | 10/1988 | Japan | |

*Primary Examiner*—Jesus D. Sotelo
*Assistant Examiner*—Stephen P. Avila
*Attorney, Agent, or Firm*—McGlew & Tuttle

[57] ABSTRACT

A LNG tank for ships having a heat insulation material applied over the outer circumference thereof, the tank being supported on a ship hull via a vertical cylindrical skirt, wherein a portion of the tank above the equator is formed by a cylinder and by a top portion of the head structure with a upward convex portion, the head structure being arranged above the cylinder, and another portion of the tank below the equator is formed by a part of the sphere having a radius substantially equal with that of the horizontal section of the equator substantially up to the range of the lat. 30°, and the remaining portion of the tank further below the range is formed by a flat semi-spherical hull structure which is a part of the laternally elongated ellipsoid of gyration or semi-ellipsoid and having the aspect ratio of substantially 1.5.

3 Claims, 4 Drawing Sheets

F I G. 3
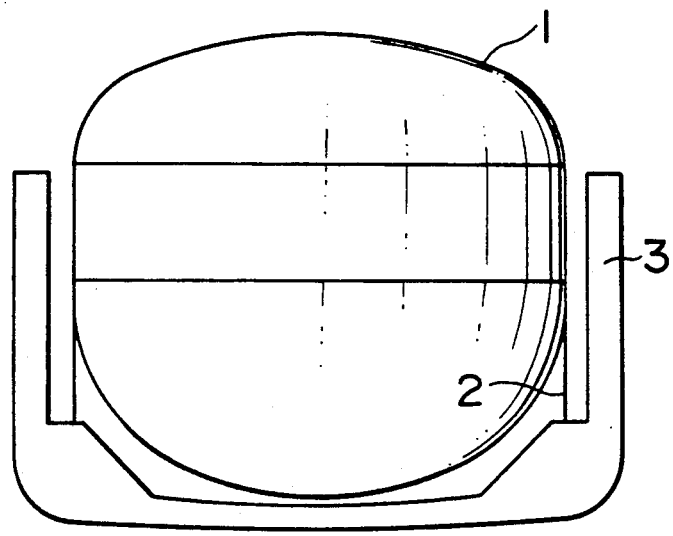

LNG TANK FOR SHIPS SUPPORTED BY MEANS OF SKIRT

FIELD OF THE INVENTION AND RELATED ART STATEMENT

The present invention relates to a LNG tank to be installed on board a LNG carrier.

Traditional LNG tanks for ships which are known in the art are generally classified into two types, i.e., a spherical tank and a vertical cylindrical tank.

While the spherical tank (shown in a side view in FIG. 5.) has a number of installation records and enjoyed a highly operational reliability so far, it nevertheless has several drawbacks as given below.

That is, since the LNG carrier is generally rectangular in the configuration of the cross-section of the hull 3, and consequently a ratio of its internal tank volume relative to the volume of the ships' compartment is limited when the tank is installed in the hull 3 while it is being supported in place by means of a skirt 2, and thereby reducing its volume efficiency. This prevents the tank 1 from being stored inside the hull 3 efficiently, and thereby creating the need of increasing the dimensions of the hull 3. Furthermore, since the tank 1 is installed to stand high above the deck, a good visibility cannot be ensured for a person standing on a bridge, and consequently the hull must be provided with a upper-structure of elevated height. Accordingly, the pressure receiving area of the entire hull 3 is increased and consequently a wind resistance gets larger. Additionally, the center of gravity of the entire hull becomes high, and the stability of the ship is exacerbated (meanwhile, a heat insulating material whihc is applied around the outer circumference of the tank 1 is ommited in drawings).

On the other hand, the vertical type cylindrical tank has been proposed as a means of solving the abovedescribed drawbacks encountered in the spherical tank. However, it is a preposition for this tank to support the tank bottom by means of a ship bottom structure via a heat-insulating material and is distiguished from the spherical tank wherein a skirt 2 is used to support the tank. The bottom of the ship is subject to a water pressure with variable waves and the like, and can be significantly deformed. Thus, the tank bottom plate is subject to a repeated deformation, and causes a hull strength-related problem. Moreover, another problem is caused that a maintenance work and an inspection for the tank bottom portion get rather difficult to perform.

OBJECTS AND SUMMARY OF THE INVENTION

It is therefore an object of the present invention to solve the afore-described problem in the traditional LNG tank. In other word, it is an object of the present invention to provide a LNG tank for ships supported by means of a skirt, the tank being designed to provide an enlarged volume to realize a compact hull, and moreover is adapted to improve visibility from a bridge and reduce a wind resistance, by installing the tank so that it does not stand high above the deck, and is further characterized by a lowered center of gravity and non-interference with the hull structure.

To achieve the purpose, the present invention provides for the LNG tank for ships, wherein the tank has a heat insulation material applied over the exterior surface thereof and is supported on the hull through a vertical cylindrical skirt, the tank being characterized in that a tank portion above its equator is formed by a cylinder and a top portion of the convex-shaped head structure which is arranged above the cylinder in series, whereas a tank portion below the equator is formed by a part of spherical body which has the radius substantially equal with the that of the equator portion in its horizontal section up to a range substantially at lat. 30°, and a further tank portion below the second described tank portion is formed by a flattened semi-spherical structure which is a part of an ellipsoid of gyration or a semi-ellipsoid.

The LNG tank for ships in accordance with the present invention which is supported in position by mean of the skirt may display several effects or advantageous merits as given below.

(1) The volume efficiency of the tank is superior to that of the traditional spherical tank. That is, since a tank portion below an equator is slightly flattened and substantially close to a square confiquration, a dead space which would otherwise be created within the hull can be reduced. Moreover, the ratio of the tank surface area relative to its volume may be reduced in comparison with the spherical tank with the same height, and thus the amount of heat insulation matetials which is needed to apply over the tank outer circumferential surface can be saved by approximately 3%. Moreover, since the tank cover dimensions may be decreased, the number of dry air equipments may be reduced.

(2) The improved tank volume efficiency may result in the reduced tank height. Thus, it becomes possible to install the tank on deck so that it does not stand so high above the deck as found in the case of the traditional spherical tank, and thereby ensuring an improved visibility from the bridge. This also serves to dispense with the need of building the upper-structure to stand high above the deck. Thus, the vibration characteristics in the living quarters can be improved and the wind pressure area may be reduced as much as approximately 30%, which provides the ship with an improved navigation performance in service.

(3) Because the center of gravity may be lowered for the hull in comparison with the spherical tank, and therefore an improved stability can be ensured for the ship. As the tank volume is increased relative to its ship breadth, it is possible to arrange an aft peak tank, engine room, cofferdam, tank compartment and fore peak tank with an adequate positional allowance kept therebetween despite the fact that the ship is relatively short in length compared to its breadth, and thus an improved design flexibility is ensured.

(4) Since the tank is supported at its equator portion in position by means of the skirt, several influential forces derived from the deformation of the hull are absorbed by the flexibility of the hull, and thereby preventing any adverse effect from being imposed upon the tank. Besides, the skirt may be designed small in proportion with the reduced height of the tank.

(5) Since the tank is formed not merely in a head structure, but in a spherical configuration having a radius substantially equal with that of equator portion in its horizontal section up to a range approximately at lat. 30° from the equator, it becomes possible to design the tank so that the tank is free from a buckling problem which is due to a complicated wave motion at the time when the tank is halfly loaded, ensuring the same reliability as in the traditional truly spherical tank.

(6) Since the tank portion below the above-described spherical portion in the southern hemisphere, i.e., the portion above the lat. 30° is formed by a part of the ellipsoid of gyration, and with the aspect ratio (a/b) of around 1.5, a compressive stress which may be caused at a minor curvature portion due to an internal pressure may be suppressed as negligible, and thereby eliminating the need of use of any buckling-resistant design.

(7) If the ellipsoid of gyration is formed in a semi-ellipsoid configuration, the spherical portion and a tangential line may be made equal, whereby ensuing a smooth joint of them. To this end, a local bending stress may be suppressed to permit the tank maintain an uninterrupted appearance. Furthermore, this configuration makes the LNG tank easier to fabricate than an ellipsoid of gyration which is difficult to work.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

In the drawings:

BRIEF DESCRIPTION OF THE DRAWINGS

FIG. 3 is a side view illustrating the tank as it is installed on the ship hull;

DETAILED DESCRIPTION OF PREFERRED EMBODIMENTS

Figure 1:
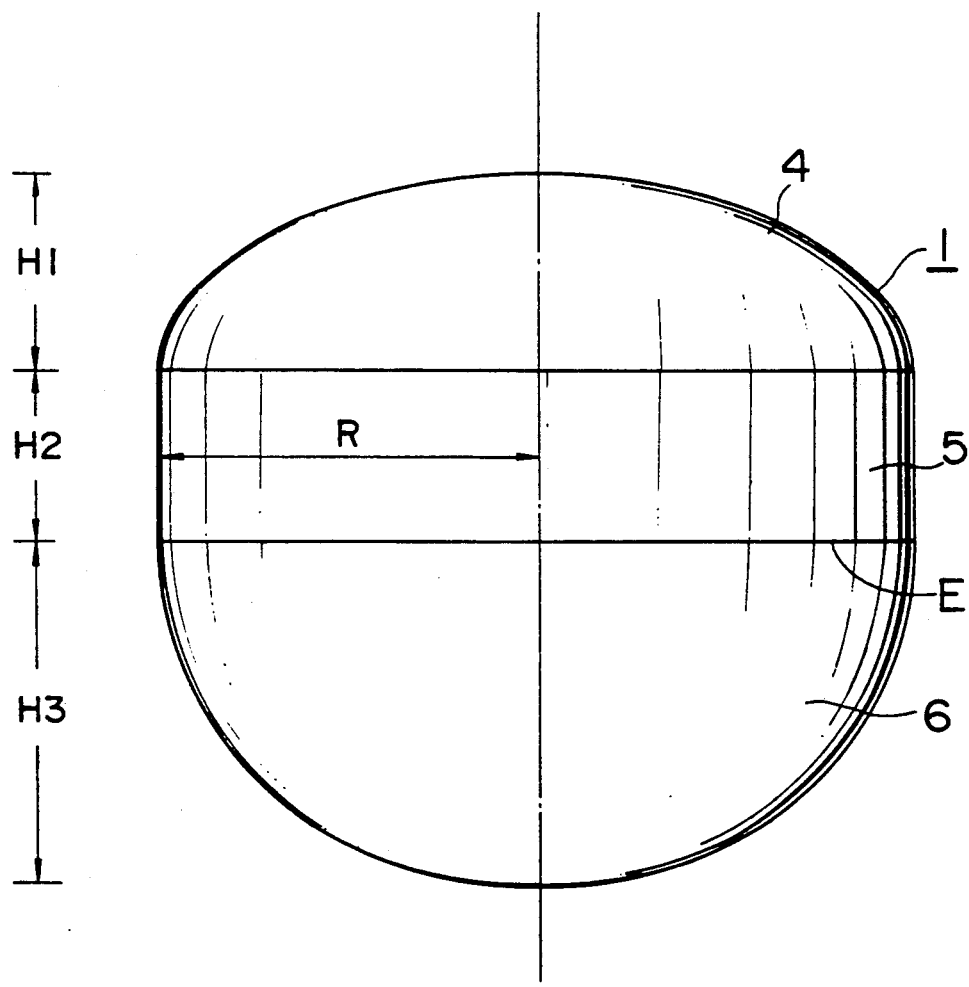
FIG. 1 is a side view of the tank.
Figure 2:
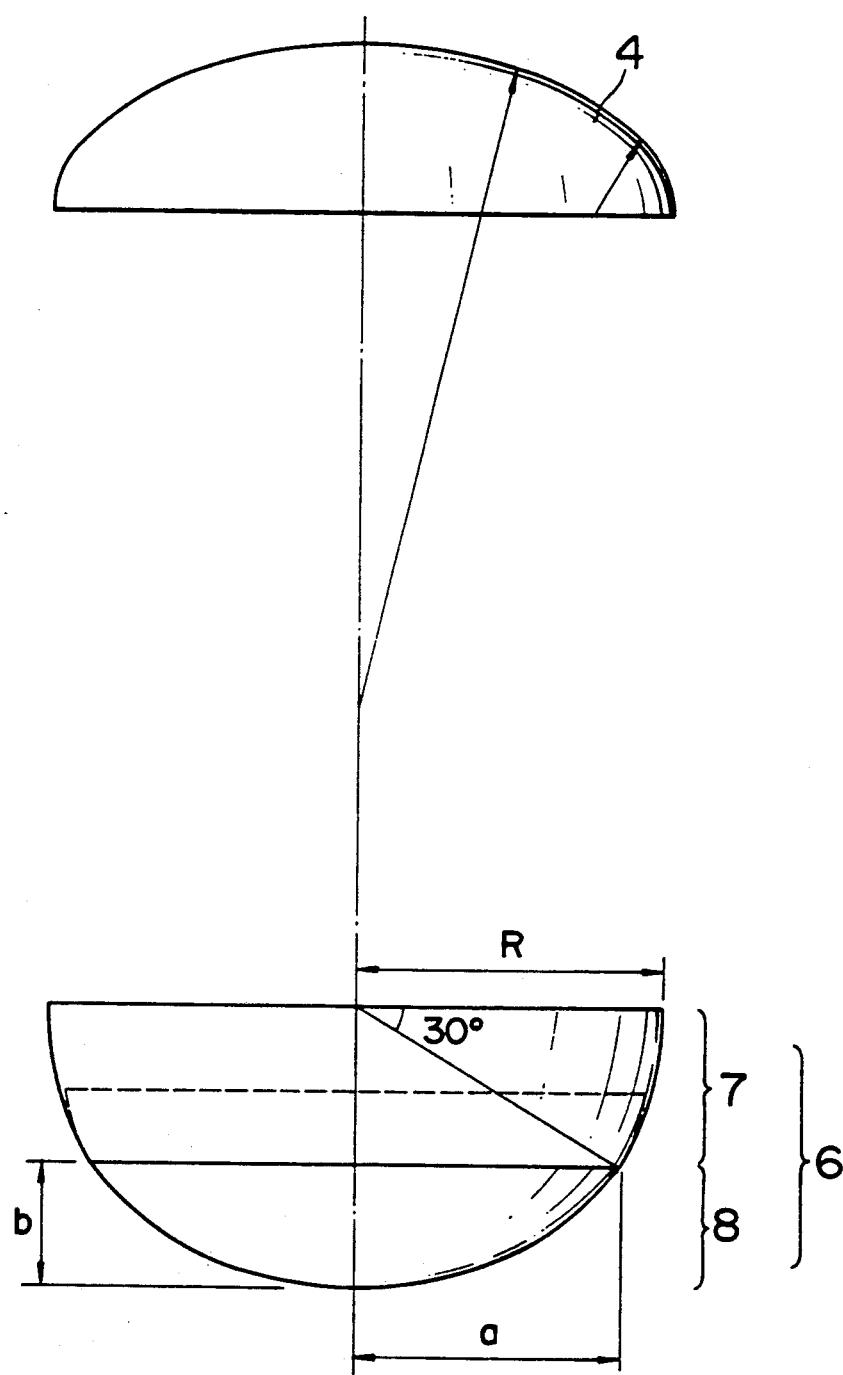
FIG. 2 is a side view illustrating the configurations of the top and the lower portion of the tank.
Figure 5:
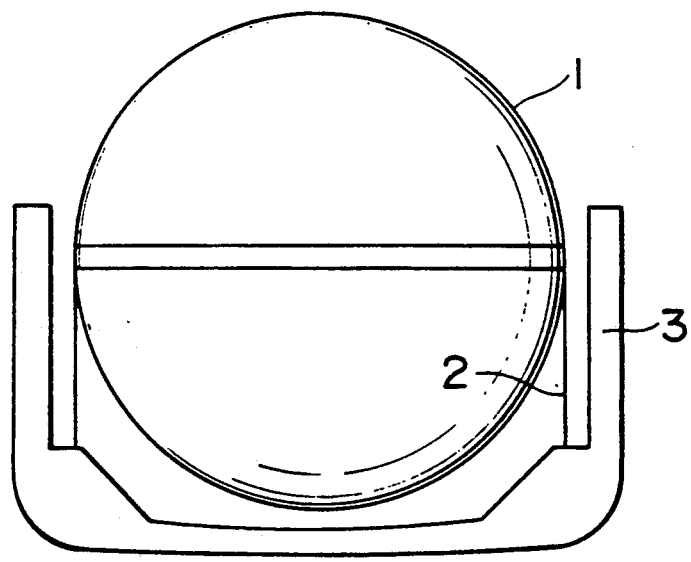
FIG. 5 is a side view illustrating the LNG tank for ships which is supported in position by means of a traditional skirt.

Meanwhile, it is to be noted that similar reference numerals are used in FIG. 5 to represent components similar to those in FIG. 1 through 4.

First a reference numeral 1 represents a LNG tank in the first embodiment which is supported in position via a vertical cylindrical skirt 2 on a hull 3. The LNG tank is formed in a flattened spherical configuration having a vertical diameter (height) slightly shorter than the equator diameter.

In this way, since the LNG tank is formed with a configuration having a sightly flattened and being substantially close to a square, and no dead space is created inside the hull 3, the LNG tank may be installed on deck so that it does not stand high above the hull 3.

The configuration of the LNG tank will be described hereinbelow.

Provided above the equator of the LNG tank are a cylindrical portion 5 having a radius R and a height H2, and a top portion 4 with a head structure having a height H1 which is arranged above the cylindrical portion 5 in series.

On the other hand, the lower half portion 6 below the equator (southern hemisphere) is formed by a spherical portion 7 having a radius which is substantially equal with that of the horizontal section of the equator substantially up to the range of lat. 30°, and by an ellipsoid portion of gyration 8 which is arranged below the spherical portion 7 in series.

This ellipsoid of gyration 8 is formed by a part of laterally elongated ellipsoid of gyration, remaining portion of which is shown by a broken line. The ellipsoid of gyration 8 is formed with such a configuration as to provide an aspect ratio, i.e., the ratio between the longitudinal dimension b and a lateral dimension a (a/b) is substantially $1.5 \sim 3.0$.

Assuming the typical sizes of the heights H1, H2 and H3 of each members as below;

$R/H1 \approx 1.5$ $2.5 \leq R/H2 \leq 3.3$ $1.1 \leq R/H3 \leq 1.2$

The LNG tank in this case could provide a satisfactory stability performance.

Assuming further that the ratio $a/b \approx 2.5$, a compressive stress which is created inside a minor curvature portion due to the internal pressure of the LNG tank can be suppressed to be negligible, and consequently the use of any buckling resistant design is rendered unnecessary.

Next, a second embodiment of the present invention will be described hereinbelow with reference to FIG. 4.

This second embodiment is different from the first embodiment in that the ellipsoid of gyration is formed as a semi-ellipsoid 8'.

Figure 4:
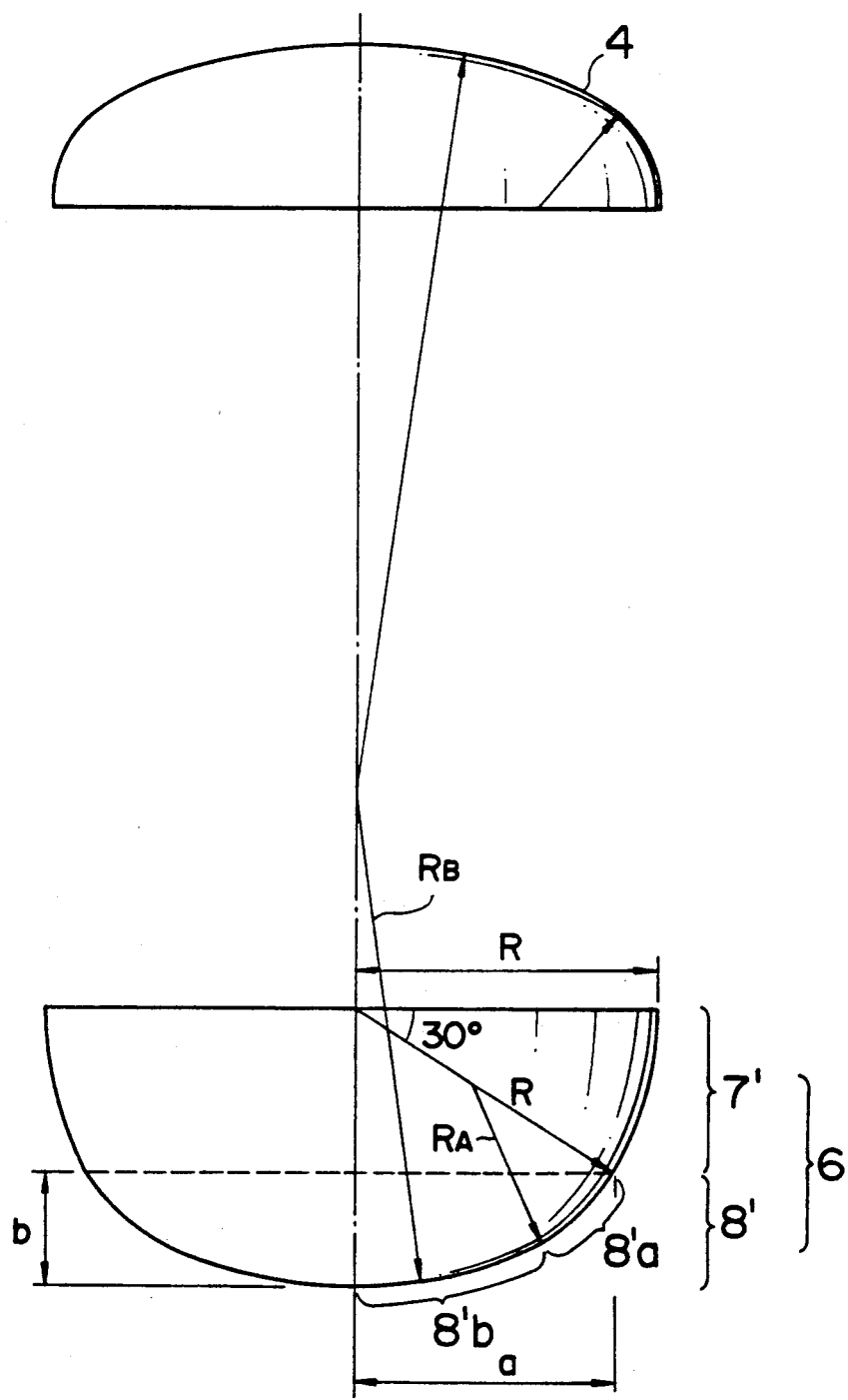
FIG. 4 is a side view illustrating the configurations on the top and the lower portion of the LNG tank for ships in its second embodiment which is supported in position by means of a skirt.

In other word, the semi-ellipsoid 8' in FIG. 4 is formed by a dish-like portion 8' b which is formed from a part of the spherical body having a radius $R_B$ larger than the that R of the equator, and by an annular portion 8' a which is formed from a part of sphere having a radius $R_A$ smaller than that R and being arranged above the dish-like portion 8' b in series.

In the meantime, in this case, the ratio $a/b \approx 2.5$ is likewise maintained.

This constitution may permit the compressive forces which would be created at a minor curvature portion due to an internal pressure may be maintained at sufficiently a small amplitude, and thus the need of using a buckling resistant design is eliminated. Moreover, the semi-ellipsoid 8' and the spherical portion 7 share a common tangential line, and so they can be jointed together smoothly. As a result, any local beding stress which may be creasted at the joint portion may be suppressed, and thus the tank can maintain a smooth and uninterrupted appearance.

While specific embodiments of the invention have been shown and described in detail to illustrate the application of the principles of the invention, it will be understood that the invention may be embodied otherwise without departing from such principles.

What is claimed is:

1. An LNG tank having a heat insulative material applied to its outer circumference and being supported on a hull of a ship by a vertical cylindrical skirt extending from a portion of an equator of the tank to the ship hull, the tank comprising: an equator portion extending in a region above the equator in the form of a cylinder; a top portion including an upwardly convex plate structure disposed above said equator portion; a bottom portion provided below said equator, said bottom portion having a spherically shaped part having the same radius as that of the cross-sectional surface of said equator substantially up to a range of latitude 30 degrees, said bottom portion having a lower part beyond said range of latitude 30 degrees being formed as one of a laterally long gyration ellipsoid and a semi-ellipsoid providing said bottom portion of said tank below said equator with a flat semi-spherical shell structure.

2. A LNG tank for ships having a heat insulation material applied over the outer circumference thereof, said tank being supported on a ship hull via a vertical cylindrical skirt, wherein a portion of the tank above an equator is formed by a cylinder and by a top portion of a head structure, said head structure having an upward convex portion, said head structure being arranged above the cylinder, and another portion of the tank below the equator is formed by a part of a sphere having a radius substantially equal with that of the horizontal section of the equator substantially up to the range of latitude 30 degrees, and a remaining portion of the tank further below said range is formed by a flat semi-spherical hull structure which is a part of an ellipsoid of gyration or a semi-ellipsoid, the tank having a dimensional relationship maintained between members as follows:

$R/H1 \approx 1.5$ $2.5 \leq R/H2 \leq 3.3$ $1.1 \leq R/H3 \leq 1.2$ where R is a radius of the equator, H1 and H2 are the heights of the top portion and the cylinder which constitute the portion of the tank above the equator and H3 is the height of the portion of the tank below the equator.

3. An LNG tank having a heat insulative material applied to its outer circumference and being supported on a hull of a ship by a vertical cylindrical skirt extending from a portion of an equator of the tank to the ship hull, the tank comprising: an equator portion extending in a region above the equator in the form of a cylinder; a top portion including an upwardly convex plate structure disposed above said equator portion; a bottom portion provided below said equator, said bottom portion having a spherically shaped part having the same radius as that of the cross-sectional surface of said equator substantially up to a range of latitude 30 degrees, said bottom portion having a lower part beyond said range of latitude 30 degrees being formed as one of a laterally long gyration ellipsoid and a semi-ellipsoid providing said bottom portion of said tank below said equator with a flat semi-spherical shell structure, said lower part of said bottom portion is formed as a semi-ellipsoid having a dish portion, a part of a first sphere having a radius larger than that of the equator portion, and an annular portion consisting of a part of a second sphere having a radius smaller than that of the equator portion which is arranged above said dish portion in series.

* * * * *